(12) United States Patent
Yoda

(10) Patent No.: US 6,811,394 B2
(45) Date of Patent: Nov. 2, 2004

(54) CLAMPING LINKAGE APPARATUS IN A MOLD CLAMP APPARATUS

(75) Inventor: Tsukasa Yoda, Nagano-ken (JP)

(73) Assignee: Nissei Plastic Industrial Co., Ltd., Nagano-ken (JP)

(*) Notice: Subject to any disclaimer, the term of this patent is extended or adjusted under 35 U.S.C. 154(b) by 202 days.

(21) Appl. No.: 10/191,403

(22) Filed: Jul. 9, 2002

(65) Prior Publication Data
US 2003/0012843 A1 Jan. 16, 2003

(30) Foreign Application Priority Data
Jul. 13, 2001 (JP) ..................................... 2001-214319

(51) Int. Cl.[7] .............................................. B29C 45/64
(52) U.S. Cl. ...................... 425/590; 425/593; 425/595; 425/451.9
(58) Field of Search ................................ 425/589, 590, 425/593, 595, 451.2, 451.9

(56) References Cited

U.S. PATENT DOCUMENTS

| | | | | |
|---|---|---|---|---|
| 3,156,014 A | * | 11/1964 | Wenger ....................... | 425/595 |
| 3,590,437 A | * | 7/1971 | Annis et al. .............. | 425/451.2 |
| 3,603,248 A | * | 9/1971 | Nouel ......................... | 100/218 |
| 3,697,212 A | * | 10/1972 | Herbst ..................... | 425/451.2 |
| 3,716,323 A | * | 2/1973 | Classen .................... | 425/451.2 |
| 3,765,812 A | * | 10/1973 | Sugiyama ................... | 425/595 |
| 4,038,015 A | * | 7/1977 | Dawson .................... | 425/451.7 |
| 4,230,442 A | * | 10/1980 | Rees et al. .................. | 425/595 |
| 6,554,606 B1 | * | 4/2003 | Koide et al. ................. | 425/595 |
| 6,592,360 B2 | * | 7/2003 | Yoda et al. ................. | 425/595 |

* cited by examiner

*Primary Examiner*—James P. Mackey
(74) *Attorney, Agent, or Firm*—Wiengarten, Schurgin, Gagnebin & Lebovici LLP

(57) ABSTRACT

The mold clamp apparatus comprises a toggle mechanism provided with a hollow pressure support body at the link tip. A movable platen is provided oppositely to a fixed platen and is supported by inserting therethrough a tie bar across a link reception platen of the toggle mechanism and the fixed platen of the toggle mechanism. A clamping rod enters and exits a pressure support body at the back center of the movable platen. A quick traverse mechanism of the movable platen is provided. A clamping linkage apparatus is arranged between the movable platen and the toggle mechanism by inserting the tie bar through the installation platen. A linkage plate having a tilting pin of the installation platen inserted therein is attached to the pressure support body together with a casing.

3 Claims, 7 Drawing Sheets

CLAMPING LINKAGE APPARATUS IN A MOLD CLAMP APPARATUS

BACKGROUND OF THE INVENTION

1. Field of the Invention

The present invention concerns a clamping linkage apparatus for integrally linking a toggle mechanism or clamping ram in a mold clamp apparatus of an injection molding machine and a movable platen side compression rod during a mold clamp.

2. Detailed Description of the Prior Art

Conventionally, it is known to maintain the mold clamp by linking the clamping rod and a clamping output unit side during the mold clamp by separating the clamping output unit by means of a toggle mechanism, clamping cylinder or others and the movable platen side clamping rod, in order to permit the clamping rod entering and exiting the clamping output unit, and increasing the opening end closing movement speed of the movable platen by a quick traverse mechanism, quick traverse cylinder or the like, without being constrained by the clamping output unit.

As for this linkage means, there is one of a structure wherein a pair of openable and closable linkage plate is attached to the tip face of a hollow clamping ram together with an operation apparatus, for reacting to the injection pressure, by integrally linking a clamping rod of a movable platen back face entering and exiting in a tOggle mechanism or in the clamping ram with them by means of the linkage plate only during the mold clamp.

In such a clamping linkage apparatus, hydraulic pressure, electricity or others are adopted as opening and closing operation source for the linkage plate according to mold clamp driving source. A clamping linkage apparatus using hydraulic pressure as opening and closing operation source is simple, because it is enough to link the linkage plate to the piston of the hydraulic cylinder attached to the clamping cylinder by providing a guide; however, in case of electricity, an apparatus for converting the turning force of an electric motor into a linear-motion and, moreover, the mold clamp after the linkage can not be maintained as easily as the case of hydraulic pressure, making the structure unexpectedly complicated.

The present invention has been devised from the aforementioned situation and has an object to provide a clamping linkage apparatus of novel composition that can omit the opening and closing operation source that has been essential for the conventional clamping linkage apparatus, by closing the linkage plate by the mold clamp operation, and that can be applied to hydraulic or electric mold clamp apparatus without modifying the structure.

SUMMARY OF THE INVENTION

The present invention according to the aforementioned object is the one comprising an installation platen having the through hole for a movable platen side clamping rod at the center and a pair of tilting pins opposed outwardly at both sides of the through hole; a pair of openable and closable linkage plates for the clamping rod provided at both sides of the through hole by insertion of the tilting pins therethrough; a casing slidably supporting the linkage plates at both sides of the central rod through hole according to the relation to the tilting pins, and attaching the linkage plate to a clamping output unit side pressure support body; a slide block attached to the outside of both linkage plates through a spring member; and a locking block protruded from the platen face of the installation platen by opposing the slant inner face to the outside edge of the slide block.

The mold clamp apparatus of the present invention is the one comprising a toggle mechanism provided with a hollow pressure support body at the link tip, a movable platen opposed to a fixed platen and supported by insertion of a tie bar across a link reception platen and the fixed platen of the toggle mechanism and having a clamping rod entering and exiting the pressure support body at the back center thereof, and a quick traverse mechanism of the movable platen, the installation platen is interposed between the movable platen and the toggle mechanism by insertion of the tie bar, the linkage plates having inserted therein the tilting pins of the installation platen are attached to the pressure support body together with the casing, and the pressure support body and the clamping rod are installed linkably by the linkage plates.

On the other hand, the mold clamp apparatus of the present invention is the one comprising a hydraulic operation clamping cylinder provided with a hollow clamping ram as a pressure support body, a movable platen opposed to a fixed platen and supported by insertion of a tie bar across a support platen and the fixed platen of the clamping cylinder, and having a clamping rod entering and exiting the clamping ram at the back center thereof, and a quick traverse mechanism of a movable platen, the installation platen is interposed between the movable platen and the clamping cylinder by insertion of the tie bar, the linkage plates having inserted therein the tilting pins of the installation platen are attached to the clamping ram together with the casing, and the clamping ram and the clamping rod are installed linkably by the linkage plates.

BRIEF DESCRIPTION OF THE DRAWINGS

These and other objects and advantages of the present invention will become clear from the following description with reference to the accompanying drawings, wherein.

DESCRIPTION OF THE PREFERRED EMBODIMENT

Figure 1:
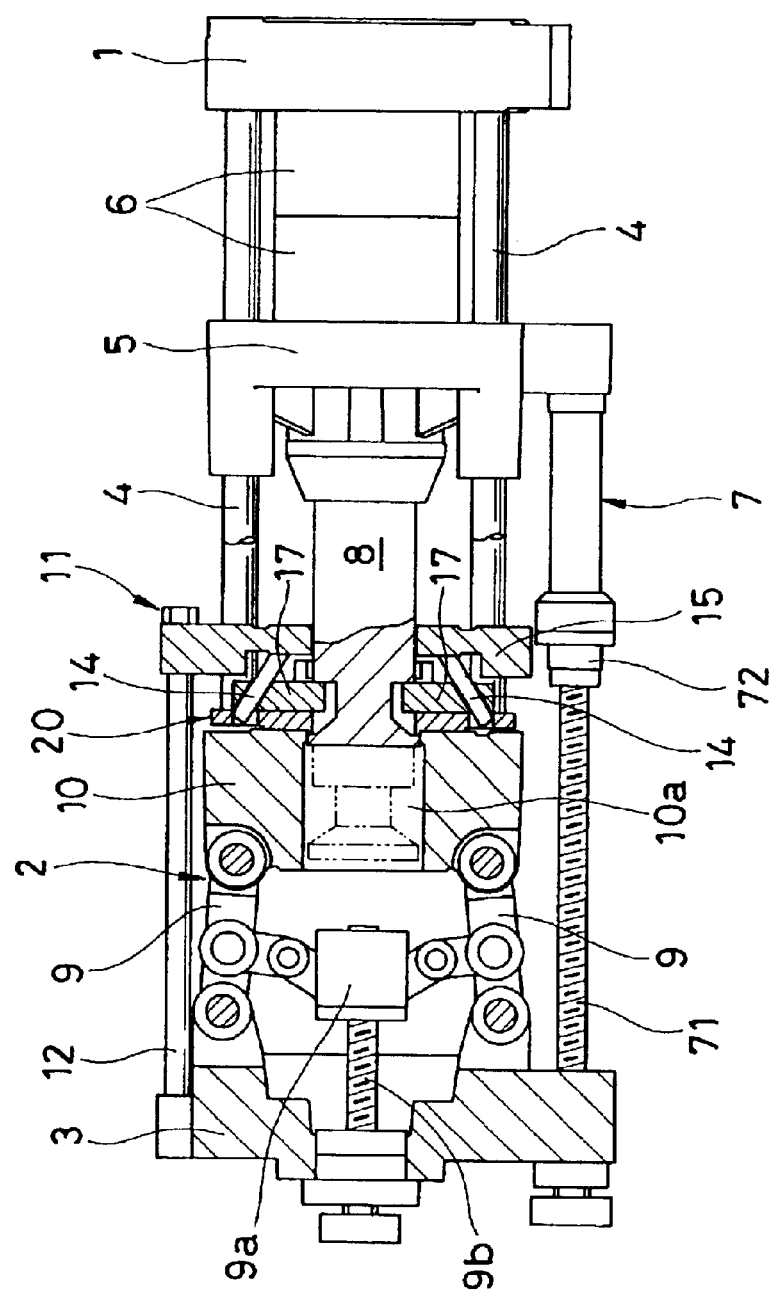
FIG. 1 is a plane view showing by section essential parts of a toggle mechanism mold clamp apparatus provided with a clamping linkage apparatus according to the present invention.

FIG. 1 to FIG. 6 show a clamping linkage apparatus in a mold clamp apparatus provided with an electric toggle mechanism as clamping output unit.

The mold clamp apparatus is made of the one composed to link a fixed platen 1 and a link reception platen 3 of a toggle mechanism 2 by tie bars 4, 4 in four corners, mount a die 6 on the opposed faces of a movable platen 5 supported by inserting into the tie bar 4, 4 and the fixed platen 1, open and close the die by an electrically driven quick traverse mechanism 7 installed across the movable platen 5 and the link reception platen 3, and permit to compress the die by the linkage of the toggle mechanism 2 and a clamping rod 8 on the back center of the movable platen 5.

The toggle mechanism 2 comprises a hollow pressure support body 10 where the clamping rod 8 enters and exits at the link tip of a double link 9, 9 and between the pressure support body 10 and the movable platen 5, a clamping linkage apparatus 11 is inserted into the tie bar 4, 4 and arranged by linking to the link reception platen 3 by a rod 12, so as not to impede the die thickness adjustment by advance or retreat movement with the toggle mechanism 2.

This clamping linkage apparatus 13, comprises an installation platen 15 having a insertion through hole 13 for the clamping rod 8 at the middle of a platen element having tie bar insertion through holes in four corners and a pair of tilting pins 14, 14 opposed outwardly at both sides of the insertion through hole 13, a pair of linkage plates 17, 17 disposed on both sides of the insertion through hole 13, by fitting the tilting pin 14 into a guide hole 16 in the face perforated with an identical angle and a relatively larger diameter, and & casing 20 for disposing guide platens 19, 19 slidably supporting the linkage plates in relation to the tilting pins 14, 14 at both sides of the central rod insertion through hole 18 over and under front and back face plates 20*a*, 20*b* covering the front and back faces of the linkage plates 17, 17, and attaching the linkage plates 17, 17 to the pressure support body 10 by means of the back face plate 20*b*.

The inside of the linkage plate 17 is formed into an arc face of a diameter substantially equal or superior to the clamping rod 8, the inside enters an annular groove formed on the posterior section outer periphery of the clamping rod 8, the linkage plate 17 is superposed on a shoulder 8*a* and, thereby, comes into contact with the clamping rod 8, allowing transmission of the clamping force by the toggle mechanism 2 through the clamping rod 8. It should be appreciated that the transversal width of the annular groove is a width permitting the linkage plate 17 to enter the groove without difficulty in the elongation step of the toggle mechanism 2 and to come into contact with the shoulder 8*a*.

On the other hand, a slide block 22 is provided with a slide space by means of a pin 23, through a dish spring 21 for absorbing a stroke corresponding to the high amount of compression stroke, and a locking block 24 is protruded on the platen face of the installation platen 15 for each slide block 22, with the slant inner face opposed to the slant outside edge of the slide block 22.

The inclination angle of this slide block 22 and the locking block 24 is set larger than the inclination angle of the tilting pin 14 and, whereby, the tilting pin 14 is exempt from a forced effort, when the locking block 24 is fitted into the slide block 22, 25 is a stopper of the linkage plate 17 provided at the casing center.

A rod reception hole 10*a* inside the pressure support body 10 is formed with a larger diameter than the clamping rod, while the opening thereof is reduced in diameter and formed in a shoulder. Moreover, the rod insertion through hole 18 is formed with a diameter substantially the same as the clamping rod 8, so that its inner circumferential edge 18*a* protrudes concentrically more inside than the opening shoulder of the reception hole 10*a*. On the other hand, a rear end edge 8*b* of the clamping rod 8 is formed with a diameter substantially equal to the opening shoulder, whereby, the rear end edge 8*b* engages with the inner circumferential edge 18*a* of the back face plate 20*b*, allowing a powerful mold opening to be preformed by the toggle mechanism.

Figure 2:
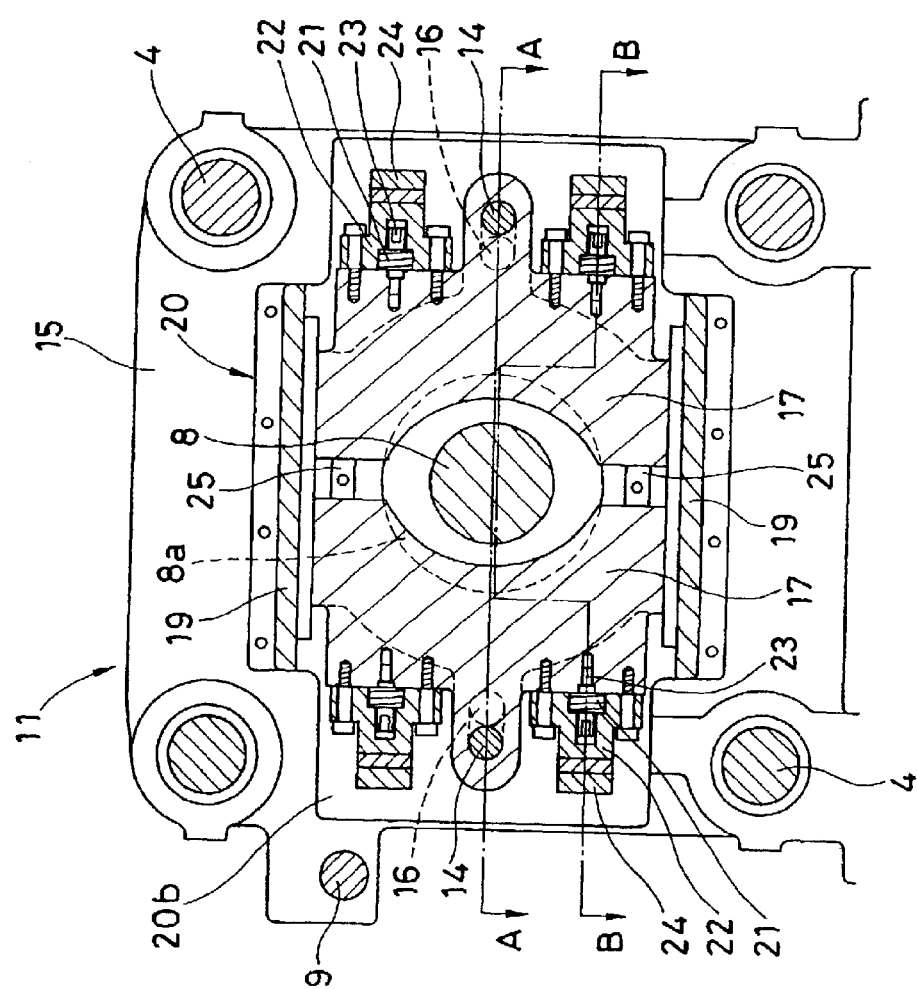
FIG. 2 is a vertical back view of the clamping linkage apparatus according to the present invention during mold clamp.
Figure 3:
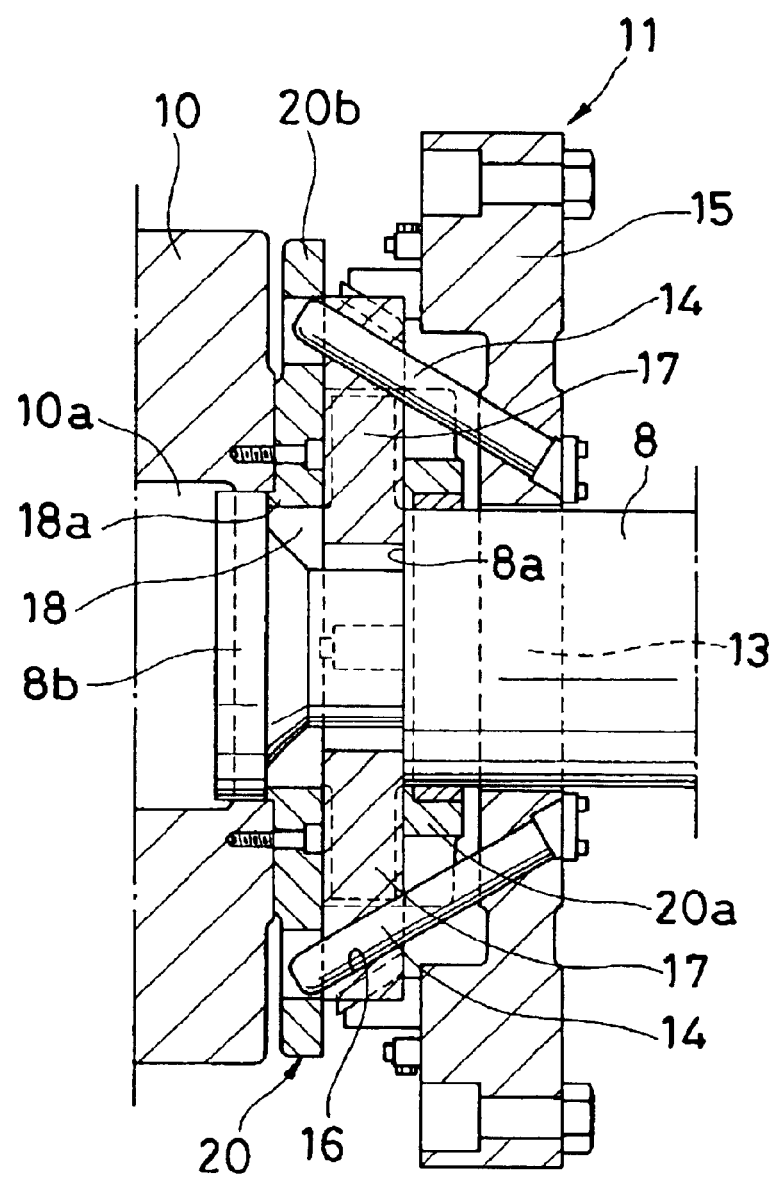
FIG. 3 is a section view along the line A—A of FIG. 2.
Figure 4:
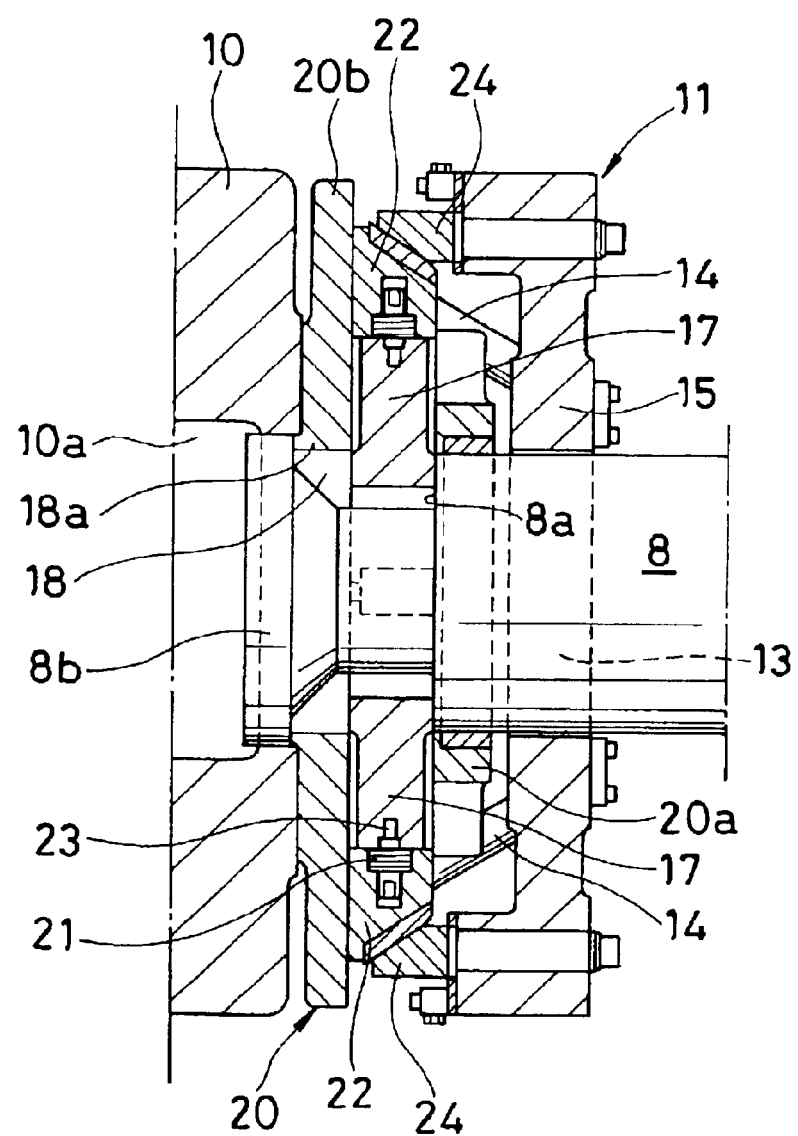
FIG. 4 is a section view along the line B—B of FIG. 2.

According to the aforementioned composition, in a mold clamp state as shown in FIG. 1 to FIG. 3, when a double link 9, 9 is put to the reduction operation, by moving backward a central head member 9*a* for operating the double link 9, 9 of the toggle mechanism 2, by rotation of a screw shaft 9*b* by driving the motor, the pressure support body 10 at the tip retreats with the linkage plates 17, 17 and, first, the rear end edge 8*b* of the clamping rod 8 engaged with the inner circumferential edge 18*a* of the back face plate 20*b* is drawn strongly by the toggle mechanism 2, for performing a powerful mold opening. At the same time, the linkage plates 17, 17 of the pressure support body tip also retreat by the movable clearance around the tilting pin together with the slide block 22. Thereby, the pushing pressure from both, sides by the locking block. 24, 24 is relieved. The clamping rod 8 is pulled strongly by the toggle mechanism 2 to perform a strong mold opening.

Furthermore, when the pressure support body 10 retreats as the reduction operation of the double link 9, 9 progresses, the pressure support body 10 separates accordingly from the installation platen 15 with the casing 20; consequently, the linkage plates 17, 17 in the casing 20 wherein tilting pins 14, 14 fixed to the installation platen 15 are fittingly inserted are extracted in the inclination orientation of the tilting pins 14, 14, because these tilting pins impede the retreat, slide in a way to open outward in the casing 20 and, at last, the inside comes out from the annular groove of the clamping rod 8 and exits the shoulder 8*a*, relieving the linkage between the clamping rod 8 and the toggle mechanism 2.

This linkage release removes the restriction of backward movement for the clamping rod 8, the clamping rod 8 can move into the pressure support body 10 without resistance and therefore, a servomotor (not shown) of the aforementioned quick traverse mechanism 7 is operated at the same time as the reduction operation end of the toggle mechanism 2, and when the screw shaft 71 rotates, the rotation is converted into a linear-motion by a nut member 72, and the movable platen 5 moves backward rapidly with the clamping rod 8, for performing the mold opening.

In addition, the mold clamp can be performed by advancing the movable platen 5 through reverse rotation of a servomotor of the quick traverse mechanism 7 just before completing the mold close and elongating the double link 9, 9 of the toggle mechanism 2. The shoulder 8*a* of the clamping rod 8 advanced forward with the movable platen 5 exits the reception hole 10*a* of the pressure support body 10 and places at the front face of the linkage plates 17, 17, because the clamping linkage apparatus 11 is set to a position where the front face of the linkage plates 17, 17 comes into contact with the shoulder 8*a* of the rod rear section by elongation of the toggle mechanism 2, at the advance limit position of the clamping rod 8.

When the elongation movement of the double link 9, 9 progresses and the pressure support body 10 advances, as the pressure support body 10 approaches accordingly the installation platen 15 which was remote together with the casing 20, the tilting pin 14, 14 fixed to the installation 15 contrarily to the mold opening, becomes an advance obstacle of the linkage plate 17, 17 in the casing 20. Whereby, the linkage plate 17, 17 goes to fit into the inclination direction of the tilting pin 14, 14, and slides to close inward in the casing 20.

Figure 5:
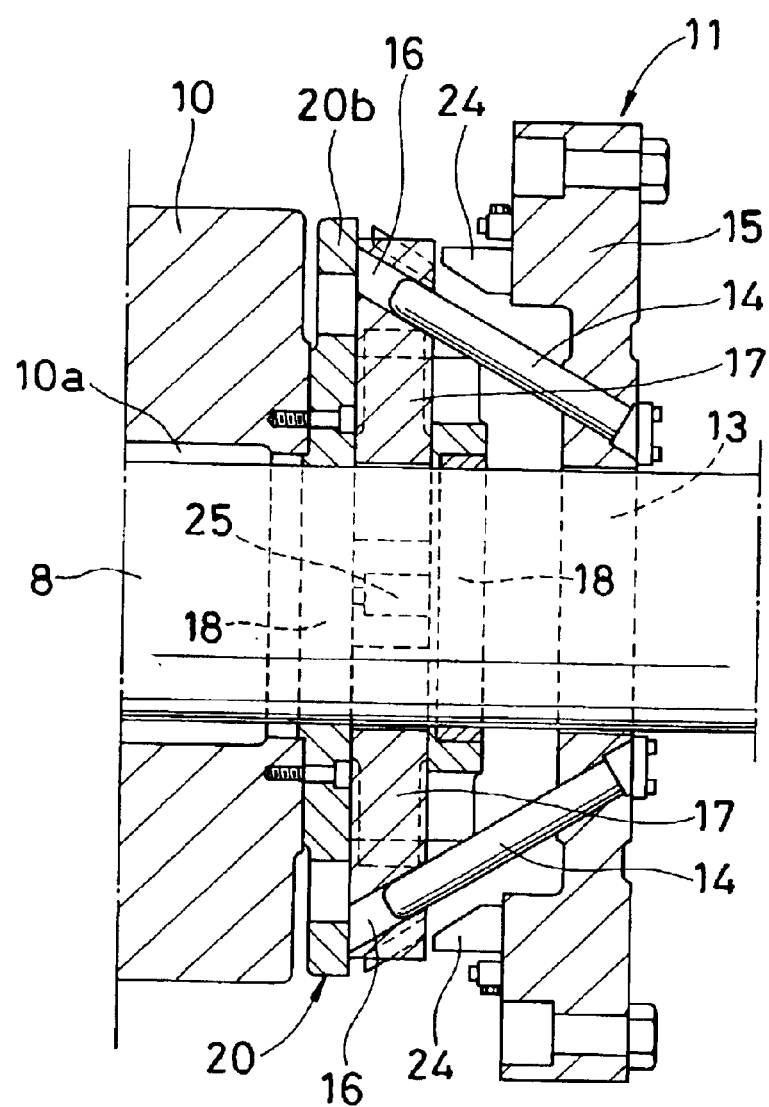
FIG. 5 is a section view along the line A—A when the mold clamp is relieved.
Figure 6:
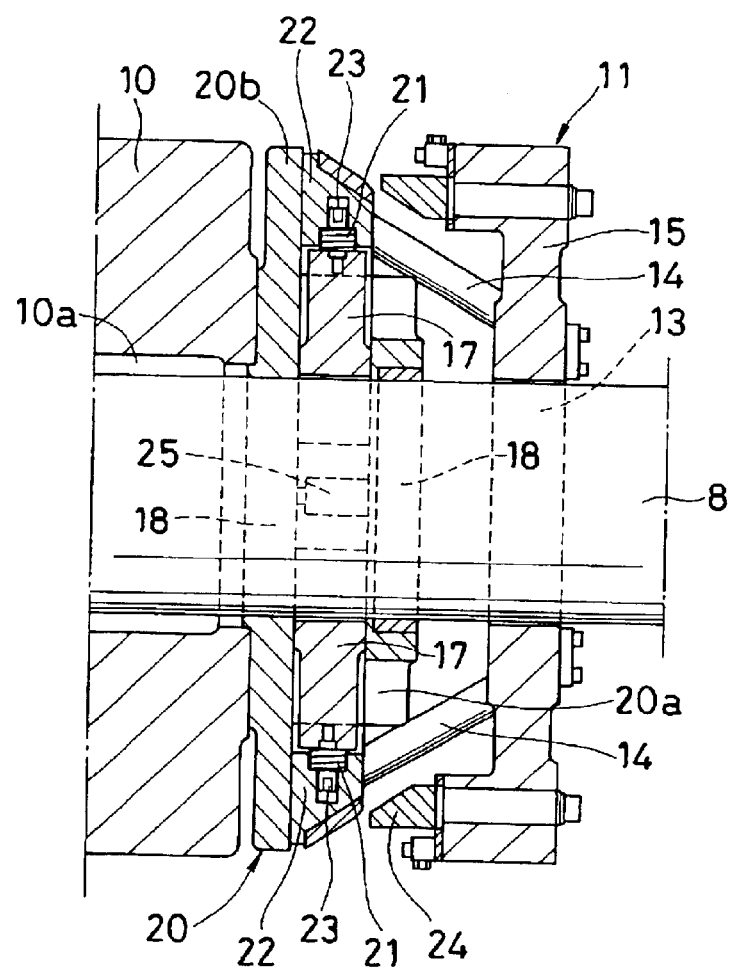
FIG. 6 is a section view along the line B—B when the die closing is relieved.

At the same time, as shown in FIG. 5 and FIG. 6, the outside slide block 22, 22 approaches the locking block 24, 24 that was separated by the mold opening, the outside edge comes into the slant inner face of the locking block 24, and guided by the inner face, the slide block 22 also moves inward together with the linkage plate 17, 17 and the inside of the linkage plate 17, 17 enters the annular groove of the clamping rod 8.

At the end, it is caught by the central stopper 25, the inside overlaps the shoulder 8a of the clamping rod 8, while the slide block 22 compresses the disk spring 21 by the locking block 24, and presses the linkage plates 17, 17 inside to maintain the mold clamp state. Whereby, the backward movement of the clamping rod 8 is restrained, the clamping rod B and the toggle mechanism 2 are integrated by the linkage plates 17, 17, and the pressure force by the elongated toggle mechanism 2 is transmitted to the clamping rod B, in a way to receive the injection pressure.

Figure 7:
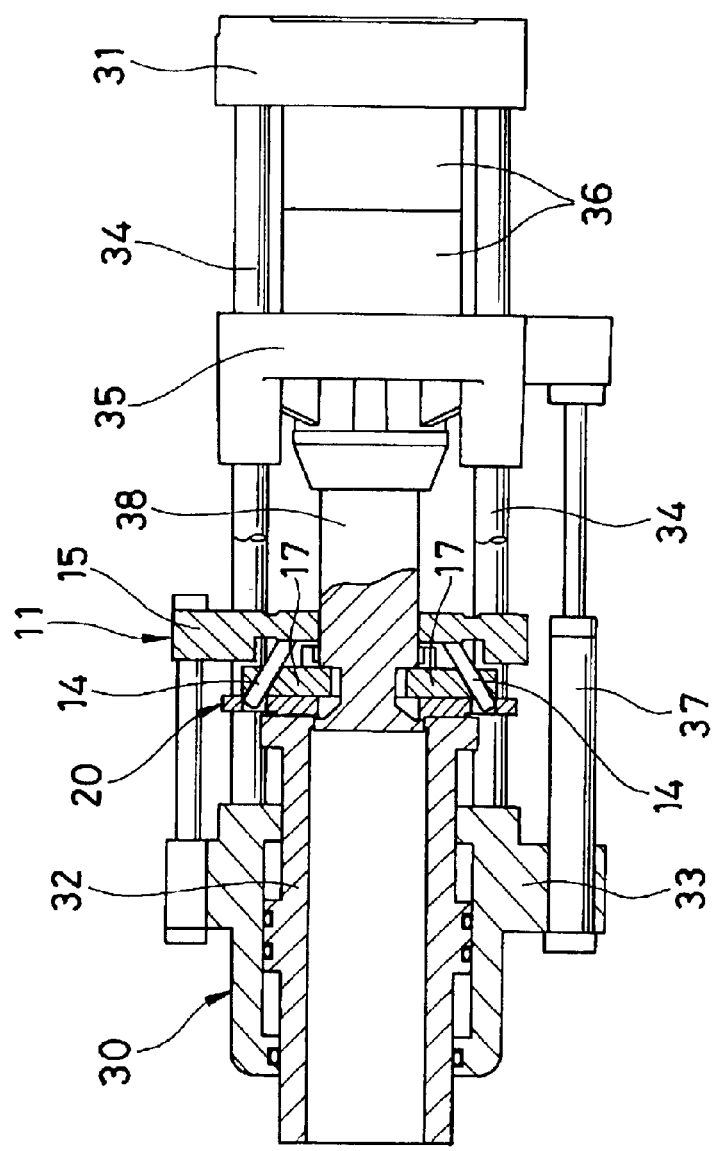
FIG. 7 is a plane view showing by section essential parts of a direct pressure type mold clamp apparatus provided with the clamping linkage apparatus according to the present invention.

FIG. 7 shows a clamping linkage apparatus 11 in a direct pressure type mold clamp apparatus provided with a hydraulic operation clamping cylinder 30 as clamping output unit.

This mold clamp apparatus is composed to link a fixed platen 31 and a support platen 33 of the clamping cylinder 30 provided with a hollow clamping ram 32 by means of tie bars 34, 34 in four corner sections, mount a die 36 on the opposed faces of a movable platen 35 inserted into the tie bar 34, 34 to support and the fixed platen 31, perform the die opening and closing by a hydraulic operation quick traverse cylinder 37 disposed across the movable platen 35 and the support platen 33 and permit to compress the die by the cooperation between a clamping rod 38 at the back center of the movable platen 35 and the clamping ram 32.

In the clamping linkage apparatus 11, the installation platen 15 is fixed to the clamping cylinder side by insertion of the tie bar 34, 34 between the clamping cylinder 30 and the movable platen 35, and the linkage plates 17, 17 fitted to the tilting pins 14, 14 of the installation platen 15 are mounted on the clamping ram 32 together with the casing 20, for arranging between the clamping cylinder 30 and the movable platen 35.

In this direct pressure type mold clamp apparatus also, the linkage and relieve of the clamping ram 32 and the clamping rod 38 and the mold clamp maintenance and relieve by the slide block 22 and the locking block 24 can be performed, as the linkage plates 17, 17 open and close similarly to the aforementioned embodiment through the advance and retreat movement of the clamping ram 32, whereby a quick die opening and closing by the quick traverse cylinder 37 and mold clamp by the clamping cylinder 30 can be performed successively and securely.

It should be appreciated that, though in any of the aforementioned embodiments, the rear end edge of the clamping rod 8, 38 are composed to be engaged so that a powerful die opening can be realized by the tensile force of the toggle mechanism 2 or clamping ram 32, in case of small molding machines requiring a low die opening force and allowing to open the die smoothly by means of the quick traverse mechanism 7 or quick traverse cylinder 37, the curved engagement structure can be omitted to simplify the rear end section of the clamping rod 8, 38.

As mentioned hereinbefore, according to the present invention, the linkage plate opening and closing operation source provided in the conventional clamping linkage apparatus becomes unnecessary and the cost can be reduced, the linkage between the clamping rod and the clamping output unit side is performed smoothly by the linkage plate, according to the operation of the clamping output unit.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. A clamping linkage apparatus in a mold clamp apparatus comprising:

an installation platen having a through hole at a center thereof for a movable platen side clamping rod, and a pair of tilting pins provided oppositely and tilted outwardly at first and second sides of the through hole on the installation platen;

a pair of openable and closable linkage plates provided at both sides of the through hole, the tilting pins inserted through respective ones of the linkage plates;

a casing slideably supporting each of the linkage plates at first and second sides of a the through hole by each of the tilting pins, and attaching each of the linkage plates to a pressure support body of a clamping output unit;

a slide block attached to an outside of each of the linkage plates through a spring member, and a locking block protruding from a platen face of the installation platen and having a slant inner face opposing an outside edge of the slide block.

2. A clamping linkage apparatus in a mold clamp apparatus according to claim 1, wherein said mold clamp apparatus comprises:

a toggle mechanism provided with a hollow pressure support body at a link tip thereof, a movable platen provided oppositely to a fixed platen, the movable platen supported by a tie bar inserted across a link reception platen the toggle mechanism and the fixed platen, the clamping rod entering and exiting the pressure support body at a center thereof, and a quick traverse mechanism of the movable platen, the installation platen being interposed between the movable platen and the toggle mechanism by insertion of the tie bar thereinto, the linkage plates having inserted therein the tilting pins of the installation platen and being attached to the pressure support body together with a casing, and the pressure support body and the clamping rod being installed linkably by the linkage plates.

3. A clamping linkage apparatus in a mold clamp apparatus according to claim 1, wherein said mold clamp apparatus comprises:

a hydraulic operation clamping cylinder provided with a hollow clamping ram as a pressure support body, a movable platen provided oppositely to a fixed platen, the movable platen supported by A tie bar inserted across a support platen of the clamping cylinder and the fixed platen, the clamping rod entering and exiting the clamping ram at a center thereof, and a quick traverse cylinder of the movable platen, the installation platen being interposed between the movable platen and the clamping cylinder by insertion of the tie bar thereinto, the linkage plates having inserted therein the tilting pins of the installation platen and being attached to the clamping rain together with a casing, and the clamping ram and the clamping rod are installed linkably by the linkage plates.

* * * * *

UNITED STATES PATENT AND TRADEMARK OFFICE
CERTIFICATE OF CORRECTION

PATENT NO. : 6,811,394 B2
DATED : November 2, 2004
INVENTOR(S) : Tsukasa Yoda

It is certified that error appears in the above-identified patent and that said Letters Patent is hereby corrected as shown below:

Title page,
Item [74], *Attorney, Agent, or Firm*, "Wiengarten" should read -- Weingarten --;

Column 1,
Line 19, "end" should read -- and --;
Line 28, "tOggle" should read -- toggle --;

Column 3,
Line 15, "13," should read -- 11 --;
Line 24, "&" should read -- a --;
Line 54, "22, 25" should read -- 22. 25 --;
Line 57, "rod," should read -- rod 8, --;

Column 4,
Line 17, "block." should read -- block --;

Column 5,
Lines 12 and 14, "B" should read -- 8 --;

Column 6,
Line 17, "of a the" should read -- of the --;
Line 51, "A" should read -- a --; and
Line 62, "rain" should read -- ram --.

Signed and Sealed this

Eleventh Day of October , 2005

JON W. DUDAS
*Director of the United States Patent and Trademark Office*